Nov. 8, 1938.  J. DE LA CIERVA  2,135,700
AUTOROTATIVE WING FOR AIRCRAFT
Filed Jan. 15, 1936
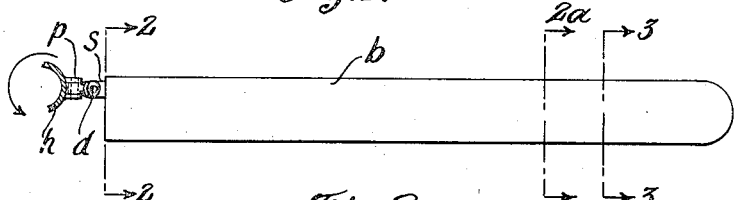
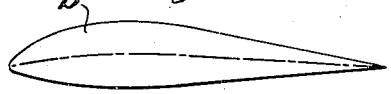
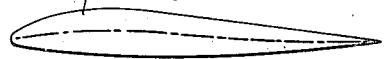
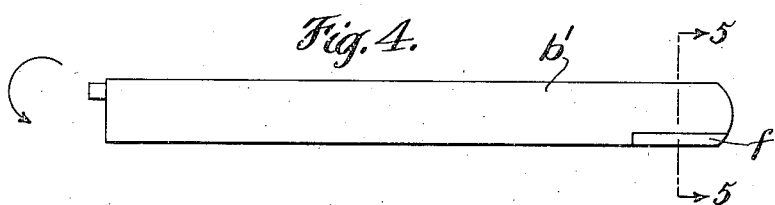
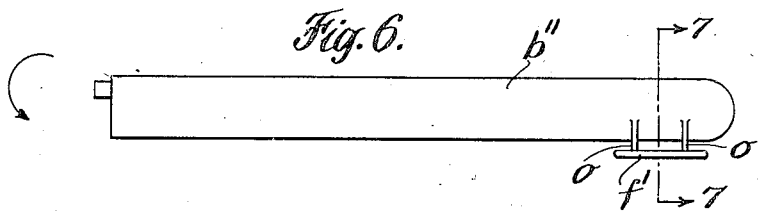
INVENTOR
Juan de la Cierva
BY
Synnestvedt & Lechner
ATTORNEYS Patented Nov. 8, 1938

2,135,700

UNITED STATES PATENT OFFICE 2,135,700

AUTOROTATIVE WING FOR AIRCRAFT

Juan de la Cierva, Madrid, Spain, assignor to Autogiro Company of America, Willow Grove, Pa., a corporation of Delaware Application January 15, 1936, Serial No. 59,294
In Great Britain January 16, 1935

12 Claims. (Cl. 244—18)

The present invention relates to aircraft with autorotative wings, and especially to the autorotative wings themselves, and is particularly useful in that type of craft wherein the principal means of support in flight consists of a system of rotative wings or blades, hereinafter referred to as a rotor, mounted for free rotation about a substantially vertical axis and adapted for autorotation in flight under the influence of the flight wind; and in which means of forward propulsion are provided comprising one or more engines driving an airscrew or airscrews or the like propulsive devices, together with means for imparting an initial rotation to the rotor, usually referred to as a rotor starter, which may comprise a disconnectible driving connection between the said engine and the rotor adapted to apply a torque to said rotor (as in Pecker U. S. Patent 1,999,636).

More particularly, the invention is especially adapted to aircraft having sustaining rotors of the kind referred to, in which the individual blades are attached to the hub or central member of the rotor by flexible or articular connections which permit each blade to swing up and down substantially in a plane containing the rotor axis. The purposes and advantages of the invention will be best understood after some consideration of the general state of this art.

In aircraft of the kind above described, the blades are generally attached to the hub each by at least two independent articulations allowing free or damped motion of the blades both in a plane approximately containing the axis of rotation of the rotor and in a plane approximately perpendicular to the rotor axis. These articulations may be referred to, respectively, as "flapping" hinges and "drag" hinges, the first being those around which all or the greater part of the blade oscillation takes place when the blade swings in a plane containing or parallel to the axis of rotation, and the second those around which all or most of the oscillation takes place when the blade swings in a plane perpendicular to the axis of rotation of the rotor or approximately fore-and-aft in the general path of rotation.

A further development of this type of craft, having an important relationship to the present invention, is disclosed in my prior British Patent Specification No. 420,322, and in the corresponding United States application, Serial No. 738,349, filed August 3, 1934, wherein there is described mechanism to enable aircraft of this kind to take-off without any run on the ground, the operation of which essentially consists in diminishing the pitch angle of the blades during the application of the starting torque by means of the rotor starter, to an angle corresponding substantially to the minimum aerodynamical (rotational) drag, and thereafter increasing the pitch angle, simultaneously with the declutching of the rotor starter transmission, to substantially the normal autorotational value suitable for forward flight. A take-off accomplished in this way, with little or no run may be conveniently referred to as a "direct" take-off.

Such aircraft may employ various expedients for controlling and regulating the rotor blade pitch angle, and the devices for this purpose fall naturally into two groups. In the first group, the pitch angle is positively regulated by mechanism controlled more or less independently of the forces acting on the rotor blades themselves, either manually by the pilot, (in which case the control may be rendered at least semi-automatic by the interposition of regulating devices), or else by means interconnected with other aircraft controls, e. g. the starter clutch, rotor brake and/or wheel brake controls, or with the undercarriage, (the control being at least semi-automatic in this case also); examples of such semi-automatic regulators, interconnections, etc., being disclosed in my copending applications, No. 59,292 and No. 59,293, both filed January 15, 1936. Pitch controlling and regulating devices falling in this first group might be referred to as "mechanical."

The second group of pitch controlling and regulating devices comprise those in which the pitch angle is controlled in a fully automatic manner in accordance with the balance of forces experienced by the rotor blades themselves, i. e., the applied torque, centrifugal force, aerodynamic lift, drag and pitching moment and inertia forces and by the elastic characteristics of the rotor blades. Devices falling in this category may be referred to as "automatic."

An object of this invention is to provide an improved and more efficient rotor, and especially an improved rotor blade particularly adapted for obtaining the most efficient direct take-off possible, and the invention will be hereinafter described with special reference to its peculiarly advantageous co-operation with the direct take-off type of machine, although a full disclosure of such machine is not included herein as it will be found in the first-mentioned co-pending application, No. 738,349.

As it is desirable to accumulate as much kinetic energy as possible in the rotor prior to a direct take-off, the aerodynamical minimum drag of the blade must be as small as possible. To obtain this, the solidity of the rotor (approximately the ratio between area of all the blades and the total disc area) should be made very small; but in addition, and in consideration of the fact that the drag of the blade increases as the square of the distance from the axis of rotation, it is of particular importance to diminish the drag at the tip. This can be done to some extent by tapering, or rounding off the tips of, the blades in plan form, or by tapering the thickness ratio of the aerofoil section, or by diminishing the camber towards the tip, or some or all of these means combined.

I have also found that an important factor lies in the choice of blade section. If unstable aerofoil sections are used, which are the most efficient, the aerodynamical pitching moment imposed on the blade in operation tends to diminish the pitch by elastic torsional deflection of the blade, and if the axes of the drag hinges are inclined outwardly on the upper sides of the blades as set forth in said application No. 738,349, the elastic distortion is supplemented by an additional pitching moment, proportional to the square of the speed of rotation and tending to decrease the pitch angle. For this reason, unstable aerofoil sections are not in general suitable for the rotor blades of aircraft designed for direct take-off, although for rotors having mechanically controlled blade pitch angles, unstable sections can be used provided the blades are made rigid enough to avoid torsional deflection through an angle greater than about 1° at the tip at the maximum starting angular speed.

According to the present invention, however, there is provided a rotor blade for an aircraft of the kind referred to, and particularly adapted for direct take-off, which is of non-uniform profile, the aerofoil sections employed comprising substantially two types at least, of which one type is of neutral or positive stability and the other type is of the unstable class.

The unstable and relatively stable sections are preferably so proportioned and relatively located and their respective degrees of instability and stability so related, that the general pitching characteristic of the whole blade is stable or at least neutral.

Preferably also the aerofoil sections near the tip are of the stable class, those nearer the root being of the unstable class.

In accordance with a preferred form of the invention the tip portion also incorporates the drag-reducing features above referred to.

As the influence of the tip sections on the torsional deflection of the blade is much greater than that of those at the root, both because the blade tip portion affects a greater length of the blade and because the squares of the relative wind speeds in that region are much greater, a relatively short length of neutral or slightly stable aerofoil near the tip of the blade will considerably diminish torsional deflection. If the tip sections are stable it is not only possible to neutralize the negative pitch deflection during starting but it is possible to reverse it, thus increasing the pitch angle during the take-off process. The above arrangement is advantageous, whatever type of pitch controlling device is employed, whether "mechanical" or "automatic."

In ordinary forward flight, the use in the rotor blades of unstable aerofoil sections produces three main effects or tendencies: (a) to decrease the average pitch angle as forward speed increases, (b) to introduce a periodic variation of pitch angle with a frequency of once per revolution of the rotor, and (c) to introduce a periodic variation of pitch angle with a frequency of twice per revolution. Of these effects, (a) and (c) are always undesirable, but (b) may sometimes be desirable as it diminishes the amplitude of that part of the flapping oscillation of the blade whose phase of maximum and minimum is longitudinal of the aircraft, i. e., it diminishes backwards tilt of the average plane of the path swept by the tips of the blades in relation to the plane normal to the axis of rotation. By using a blade compounded of at least two different aerofoil sections, those near the tip being of a stable kind, it is possible to diminish to a negligible amount effect (c), and/or to diminish to a negligible amount or to reverse effect (a), and/or to diminish to any required extent effect (b), and at the same time to accomplish by an alternative or complementary method some at least of the results concerning average pitch variation set forth as desirable in said application No. 738,349 and in my said copending applications Nos. 59,292 and 59,293, corresponding to the British provisional specifications dated January 16, 1935, No. 1546 and No. 1547.

The desired result may also be achieved by locating the stable aerofoil section otherwise than at the tip, but in this case on account of its diminished radius its degree of stability must be more pronounced or/and its length greater (relatively to the whole blade length) than when located at the tip, to produce an equivalent stabilizing effect.

Instead of or in addition to using a non-uniform aerofoil section for the rotor blades as above set forth, trailing flaps or auxiliary surfaces carried on outriggers from the trailing edges of the blades may be arranged at suitable distances from the root to produce the required effect.

How the foregoing, together with such other objects and advantages as are incident to the invention, are obtained will be further evident after perusal of the following description of the structural embodiments of the invention illustrated in the accompanying drawing, wherein:

Figure 1 shows, somewhat diagrammatically in plan view, a rotor blade embodying the present invention, and illustrates the mounting thereof on an upright hub (fragmentarily shown);

Figure 2 shows the aerofoil section of the blade, to a larger scale, on a section taken along the lines 2—2 or 2a—2a in Figure 1;

Figure 3 shows the aerofoil section taken along the line 3—3 of Figure 1;

Figure 4 shows a second embodiment in plan;

Figure 5 shows the aerofoil section taken along the line 5—5 of Figure 4;

Figure 6 shows a third embodiment in plan; and

Figure 7 shows the aerofoil section taken along the line 7—7 of Figure 6.

Referring first to Figures 1 to 3, it will be seen that the rotor blade $b$ is secured to the upright hub $h$ by a flapping hinge or pivot $p$ and a drag hinge or pivot $d$, which latter is, as shown, inclined outwardly at its upper end to make an acute angle with the longitudinal blade axis which lies substantially on the main longitudinal blade spar $s$. Although not essentially so, the blade may conveniently be made of uniform chord from the root outwardly to a point close to the outer end, where some curvature or taper in plan may be provided to reduce drag.

Between the section lines 2—2 and 2a—2a the aerofoil section is preferably uniform and is of the kind hereinbefore defined as unstable, of which the section shown in Fig. 2 is typical. The centre line of the aerofoil section is shown in Fig. 2 by dot-and-dash lines and it will be seen that the curvature of the centre line is of the same sign throughout, the said centre line being positively cambered from leading to trailing edge. This section is also of relatively greater camber, and greater thickness in proportion to chord, than the section of the outboard or tip portion.

The tip portion of the blade from section line 3—3 to the tip is also of uniform cross section, the aerofoil profile being of the kind hereinbefore defined as stable, of which that shown in Fig. 3 is typical. It will be seen that the centre line shown in dot-and-dash lines of the aerofoil profile of Fig. 3 is of the kind having "reflex curvature" in that its forward portion is positively cambered, whereas its rear portion is slightly negatively cambered and it is known that aerofoil profiles having this characteristic are stable. In addition, it will be observed that this section is of relatively less camber and smaller thickness ratio than the section in the inboard portion of the blade, and as before stated may be slightly or substantially tapered off in plan, all of which is designed to reduce drag in the tip region.

The part of the blade between the section lines 2a—2a and 3—3 may be suitably graduated to provide smooth transition from the section shown in Fig. 2 to that shown in Fig. 3. On the other hand it may be desirable to dispense with the intermediate graduated part of the blade, in which case the section as shown in Fig. 2 will be carried right up to the section line 3—3, at which point the external surface of the blade will present a stepped appearance where the two differing aerofoil sections are brought into juxtaposition.

Referring now to Figs. 4 and 5; the rotor blade $b'$ is, in this case, of uniform aerofoil profile, having an unstable characteristic, i. e., of the type shown in Fig. 2. The tip part of the blade is given a stable characteristic by providing a flap $f$ at the tip which is tilted slightly upwards so that the centre line of the aerofoil profile through the flap as shown in Fig. 5 is of the kind having "reflex curvature". The trailing portion of the aerofoil profile of the part of the blade inboard of the flap is shown in dot-and-dash lines in Fig. 5.

In the embodiment shown in Figs. 6 and 7 a similar result is achieved by mounting the flap $f'$ on a pair of outriggers $o$ behind the trailing edge of the blade adjacent the tip thereof, the blade $b''$ itself having an aerofoil profile which is uniform and of the unstable type, the centre line of the aerofoil profile being curved in the same sense from leading to trailing edge as shown in Fig. 7.

From the foregoing it will be seen that the various embodiments of the invention not only accomplish the novel and beneficial results intended, but also attain the same in a relatively simple manner. Other advantages which may be mentioned are: that a wider variety of choice of aerofoil sections for autorotative rotors is now available, since compensation for certain of the characteristics of various sections may be made by the modification of the tip portion; and further that reduction in the transmission of certain loads to the hub, such as torsional loads, is possible, by the utilization of inboard and outboard sections having their sectional centres of pressure and sectional centres of gravity so relatively arranged that a negative torsional moment in one portion of the blade may be partially counteracted by a positive torsional moment in another portion of the blade.

Numerous of the advantages are attainable in autorotative winged aircraft generally, but the invention has, as before stated, a peculiar cooperative relationship to direct take-off machines, in one form of which, as indicated in Figure 1, the blade pitch angle is varied, for example, automatically, as by the inclination of the drag hinge $d$, the details of structure and operation of which will be found in my copending application Serial No. 738,349 hereinbefore referred to.

I claim:

1. For autorotative-winged aircraft, a rotor comprising an upright normally freely rotative hub, and mounted thereon at autorotational incidence, with freedom for movement in the directions of lift, drag and pitch variation, a blade or wing of generally unstable section having in an outboard region a relatively stable section.

2. For autorotative-winged aircraft, a rotor blade or wing mounted for independent swinging and pitch-varying movements in flight and being of unsymmetrical bi-convex section throughout a major portion of the wing and of reflexly curved section in a region adjacent the tip.

3. For autorotative-winged aircraft, a rotor comprising an upright normally freely rotative hub, and a blade or wing of generally unstable section having means adjacent its root end mounting the blade at auto-rotational incidence and providing for blade flapping movements, pitch variation and movements generally fore and aft in the rotative path, and having adjacent its outer end, means for effecting a generally stable blade section characteristic comprising a supplemental aerofoil positioned behind the trailing edge of the blade.

4. For autorotative-winged aircraft, a rotor comprising an upright normally freely rotative hub, and a blade or wing of generally unstable section having means adjacent its root end mounting the blade at autorotational incidence and providing for blade flapping movements and pitch angle variation and movements generally fore and aft in the rotative path, and having adjacent its outer end, means for effecting a generally stable blade section characteristic.

5. For autorotative-winged aircraft, a rotor comprising an upright hub adapted for free rotation and a blade or wing mounted for independent swinging and pitch-varying movements in flight and having inboard and outboard portions of relatively oppositely acting torsional moment characteristics, the outboard portion being of a more stable blade section than the inboard portion.

6. For autorotative-winged aircraft, a rotor comprising an upright normally freely rotative hub, and mounted thereon at autorotational incidence, with freedom for movement in the directions of lift, drag and pitch variation, an elongated rotor blade or wing which in its tip region is of tapered or rounded plan form and of reduced camber as compared with an inner region.

7. For autorotative-winged aircraft, a rotor comprising an upright normally freely rotative hub, and mounted thereon at autorotational incidence, with freedom for movement in the directions of lift, drag and pitch variation, an elongated rotor blade or wing which in its tip region is of tapered or rounded plan form and of reduced camber and thickness ratio as compared with an inner region.

8. For autorotative-winged aircraft, a rotor comprising an upright normally freely rotative hub, and mounted thereon at autorotational incidence, with freedom for movement in the directions of lift, drag and pitch variation, an elongated rotor blade or wing which in its tip region is of a thinner and more stable section than in an inner region.

9. For autorotative-winged aircraft, a rotor comprising an upright normally freely rotative hub, and mounted thereon at autorotational incidence, with freedom for movement in the directions of lift, drag and pitch variation, an elongated rotor blade or wing which in its tip region is of a less cambered and more stable section than in an inner region.

10. For autorotative-winged aircraft, a rotor comprising an upright normally freely rotative hub, and mounted thereon at autorotational incidence, with freedom for movement in the directions of lift, drag and pitch variation, an elongated rotor blade or wing which in its tip region is of less camber and of less thickness in proportion to chord than an inner region.

11. For autorotative-winged aircraft, a rotor blade or wing mounted for independent swinging and pitch-varying movements in flight and being of unsymmetrical bi-convex section throughout the major portion of the wing and of an inherently stabilizing section in a restricted region adjacent the tip.

12. For autorotative-winged aircraft, a rotor blade or wing mounted for independent swinging and pitch-varying movements in flight and being of non-uniform aerofoil section along its length, the section over part of the length having an unstable pitching characteristic and the remainder of the blade having a relatively stable pitching characteristic, the unstable and relatively stable parts being so proportioned, relatively located and their respective degrees of instability and stability being so related, that the general pitching characteristic of the whole blade is approximately neutral.

JUAN DE LA CIERVA.